United States Patent
Hopkins (10) Patent No.: US 10,819,595 B2
(45) Date of Patent: Oct. 27, 2020

(54) DATA FLOW IN TELECOMMUNICATIONS NETWORKS USING NETWORK FLOW DIAGRAMS AND ASSOCIATED DATA

(71) Applicant: Level 3 Communications, LLC, Broomfield, CO (US)

(72) Inventor: William Hopkins, Brighton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 101 days.

(21) Appl. No.: 16/378,247

(22) Filed: Apr. 8, 2019

(65) Prior Publication Data

US 2019/0334791 A1    Oct. 31, 2019

Related U.S. Application Data

(60) Provisional application No. 62/654,937, filed on Apr. 9, 2018.

(51) Int. Cl.
*H04L 12/26*    (2006.01)
*H04L 12/751*   (2013.01)

(52) U.S. Cl.
CPC .......... *H04L 43/045* (2013.01); *H04L 43/028* (2013.01); *H04L 45/02* (2013.01)

(58) Field of Classification Search
CPC ..................................................... H04L 43/045
See application file for complete search history.

(56) References Cited

U.S. PATENT DOCUMENTS

2012/0026914 A1* 2/2012 Banerjee ............... H04L 43/026
                                                           370/253
2016/0359872 A1* 12/2016 Yadav ................. H04L 43/0894

* cited by examiner

*Primary Examiner* — Nicholas P Celani (57) ABSTRACT

Systems and methods for configuring telecommunications networks include obtaining network data flow information for a telecommunications network that includes attributes of multiple routes of data transmission through the telecommunications network. Utilizing at least one processing device, a filtering criteria is applied to the network data flow information to identify a subset of the routes having a shared attribute to generate filtered data. The filtered data is then used to generate a diagrammatic representation of the network flows and/or processed to automatically generate reconfiguration messages to improve network traffic distribution and flow.

19 Claims, 5 Drawing Sheets

DATA FLOW IN TELECOMMUNICATIONS NETWORKS USING NETWORK FLOW DIAGRAMS AND ASSOCIATED DATA

CROSS-REFERENCE TO RELATED APPLICATIONS

This application is related to and claims priority under 35 U.S.C. § 119(e) from U.S. Patent Application No. 62/654,937, filed Apr. 9, 2018, titled "DIAGRAMMATIC FLOW OF NETWORK DATA IN A TELECOMMUNICATIONS NETWORK," which is incorporated herein by reference for all purposes.

TECHNICAL FIELD

The present disclosure relates to systems and methods for implementing a telecommunications network, and more specifically to a system and method for collecting and processing network flow data for telecommunication networks, including generating diagrammatic representations of the network flow data and corresponding summary data for use in analyzing and improving network flow.

BACKGROUND

Telecommunication or other types of computer networks transmit information. Such information may involve voice, data, multimedia information, software (including patches and updates), and various other forms of digital content, and digital services, among many other things. In addition, telecommunication networks often offer features and/or services to the customers of the network that provide flexible and varied ways in which the communications are transmitted over the network. For example, some telecommunication networks provide Internet access, long distance voice capabilities, high definition audio and/or video communication capabilities, and the like. In other examples, the telecommunications network may provide various types of stored or streaming content to a user of the network.

In light of the broad and varied uses of telecommunications networks, collecting and analyzing network traffic of a network, a subnetwork, or specific devices within a network is often required to diagnose issues within a network, to optimize network resources, and to improve the overall functionality and efficiency of a network. Accordingly, there is a need for tools that facilitate the rapid collection of network data and the presentation of such data to network administrators in a useful and intuitive way, among other things.

It is with these observations in mind, among others, that aspects of the present disclosure were conceived.

SUMMARY

In one aspect of the present disclosure, a method for configuring a telecommunications network is provided. The method includes obtaining network data flow information for a telecommunications network, the network data flow information including attributes of a plurality of routes of data transmission through the telecommunications network. The method further includes applying, utilizing at least one processing device, a filtering criteria to the network data flow information to identify a subset of the plurality of routes, the filtering criteria including an attribute shared among each of the subset of the plurality of routes. The method also includes generating a network flow diagram from the network data flow information corresponding to the subset of the plurality of routes. The network flow diagram includes a representation of the attribute of the filtering criteria, representations of other attributes of the subset of the plurality of routes, and representations of the subset of the plurality of routes.

In another aspect of the present disclosure, another method for configuring a telecommunications networks is provided. The method includes obtaining network data flow information for a telecommunications network, the network data flow information including attributes of a plurality of routes of data transmission through the telecommunications network. The method further includes applying, utilizing at least one processing device, a filtering criteria to the network data flow information to identify a subset of the plurality of routes, the filtering criteria including an attribute shared among each of the subset of the plurality of routes. The method also includes generating filtered data from the network data flow information corresponding to the subset of the plurality of routes. The filtered data includes network data flow information for the attribute of the filtering criteria, network data flow information for other attributes of the subset of the plurality of routes, and network data flow information for the subset of the plurality of routes. A network data flow is then identified from the subset of the plurality of routes through an analysis of the filtered data, the network data flow comprising a performance metric exceeding a performance threshold. Finally, a reconfiguration message for an attribute of the identified network data flow is generated, the reconfiguration message configured to reconfigure the attribute of the identified network data flow to alter the identified network data flow.

In yet another aspect of the present disclosure, a telecommunications system is provided. The telecommunications system includes a telecommunications network that includes multiple network attributes and a network flow connecting the network attributes. The telecommunications system further includes at least one processing device in communication with the network attributes. The network flow is configured based on a configuration message generated by the at least one processing device. The at least one processing device generates the configuration by obtaining network data flow information for network flows through the telecommunications network; applying a filtering criteria to the network data flow information to identify routes of data transmission through the telecommunications network, the filtering criteria including an attribute shared among each of the routes; and generating filtered data from the network data flow information. The filtered data corresponds to the routes and includes network data flow information for the attribute of the filtering criteria, network data flow information for other attributes of the routes, and network data flow information for the routes.

DETAILED DESCRIPTION

Aspects of the present disclosure are directed to systems and methods for analyzing large and varied network data flows, characterizing the flows, and generating unique and intuitive graphical visualizations of such information. In certain implementations, network flow data is collected from one or more devices within a network. Such information may include, among other things, information regarding ingress and egress devices or networks, amounts of data transmitted using the flow, source and destination devices or networks, and the like. The network flow data may be stored or otherwise made accessible to a computing system configured to generate a network flow diagram for a subnetwork or device of the network for which data is available. Additionally, the computing system may also filter and aggregate the data according to various parameters. In implementations, the processed network flow data may be used to generate and/or execute configuration instructions for one or more devices within a network.

As noted above, telecommunication networks may be configured to provide a wide range of network-related services. For example and among other things, content providers (publishers) use the components or servers of telecommunications networks to serve all forms of content throughout the world. In order to offload the job of serving some or all of its content, many content providers operate or subscribe to content delivery networks (CDNs). Using a CDN, content can be primarily served from the CDN (e.g., from one or more content servers in the CDN) instead of from the content provider's server(s). Numerous forms of content may be served from the CDN. For example, television shows and movies may be accessed from any number of Web sites, and the shows and movies may be served from the CDN. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once provided on disc and mailed to recipients, are now routinely distributed to devices from a CDN through one or more network connections and devices.

Each service provided by a telecommunications network is associated with a flow of data through the network, typically in the form of data packets. Analyzing, processing, and controlling these data flows through the network may aid a network administrator in the configuration and provisioning of the network components. For example, it is often more efficient and cost effective for a telecommunications network to minimize the distance that a packet is transmitted through the network. Thus, routing a packet received in New York through Los Angeles to a destination or egress in Houston is generally not an efficient routing of the packet, if, for example, a route with fewer hops or directly to Houston is available. Minimizing the logical distance (e.g., number of routers between a source and destination), which is often reflective of a shorter geographic distance, the packet is transmitted through the network may optimize costs, lessen or balance traffic congestion through the network, and have other advantages. However, since some telecommunications networks may process millions of such data flows per day and manage thousands of network devices, efficient and intuitive computerized management tools are required.

As such, aspects of the present disclosure involve systems, methods, computer program products, and the like, for generating one or more data flow diagrams for use by network engineers or administrators to configure or provision network elements to improve the efficiency and operation of a telecommunications network. In one particular implementation of the present disclosure, a diagrammatic data flow system may receive network flow information, process the network flow information to reduce the volume of information into an understandable quantity of information, and generate a Sankey-like graph or diagram of the network flow information. Further, the diagrammatic data flow system may provide one or more network configuration commands based on the analyzed network flow data to improve the efficiency or cost of the operation of the network. In this manner, the diagrammatic data flow system may receive network flow data for a telecommunications network and process the data into a diagram of network flow data that can be utilized for network configuration.

As mentioned, telecommunications networks may process several million data flows or routes through the network in any given day. Thus, one particular aspect of the present disclosure provides for filtering of network flow data to provide a visual diagram of a portion of the data flow through the network. In one particular implementation of the present disclosure, such filtering applied by the diagrammatic data flow system may obtain the network flow information of a particular component, gateway, port, or region (known as an "attribute" of the network) of the telecommunications network from the entire network flow data and provide a visual diagram of that portion of the network flow data. Further, network data flows that process a fewer number of data bytes may be collected or gathered together into a single data flow in the diagram of network flows, and in some cases may be removed from the diagram altogether if the bytes of the data flow is measured as below a threshold value. In general, the network flow data may be parsed or manipulated in any manner to provide a more coherent visual diagram of network flow data.

Further still, the visual diagram of network flow may provide commands or suggestions for improving the operation of the telecommunications network. For example, the diagrammatic data flow system may identify a route between two or more components of the network that does not minimize the distance a communication packet is transmitted. The system may then color the identified route in the network flow diagram with a particular color that indicates the efficiency or cost-effectiveness of the route is not maximized or may be improved. In further examples, the diagrammatic data flow system may create and/or transmit one or more provisioning instructions to components of the network based on the information included in the network flow diagram to improve the efficiency or operation of the network. In this manner, the diagrammatic data flow system may utilize the information obtained or displayed in the network flow diagram to configure aspects of the telecommunications network to increase the operating cost and effectiveness of the network. In still other examples, a network engineer or administrator may utilize information provided in the network flow diagram to provide network configuration instructions or commands.

Figure 1:
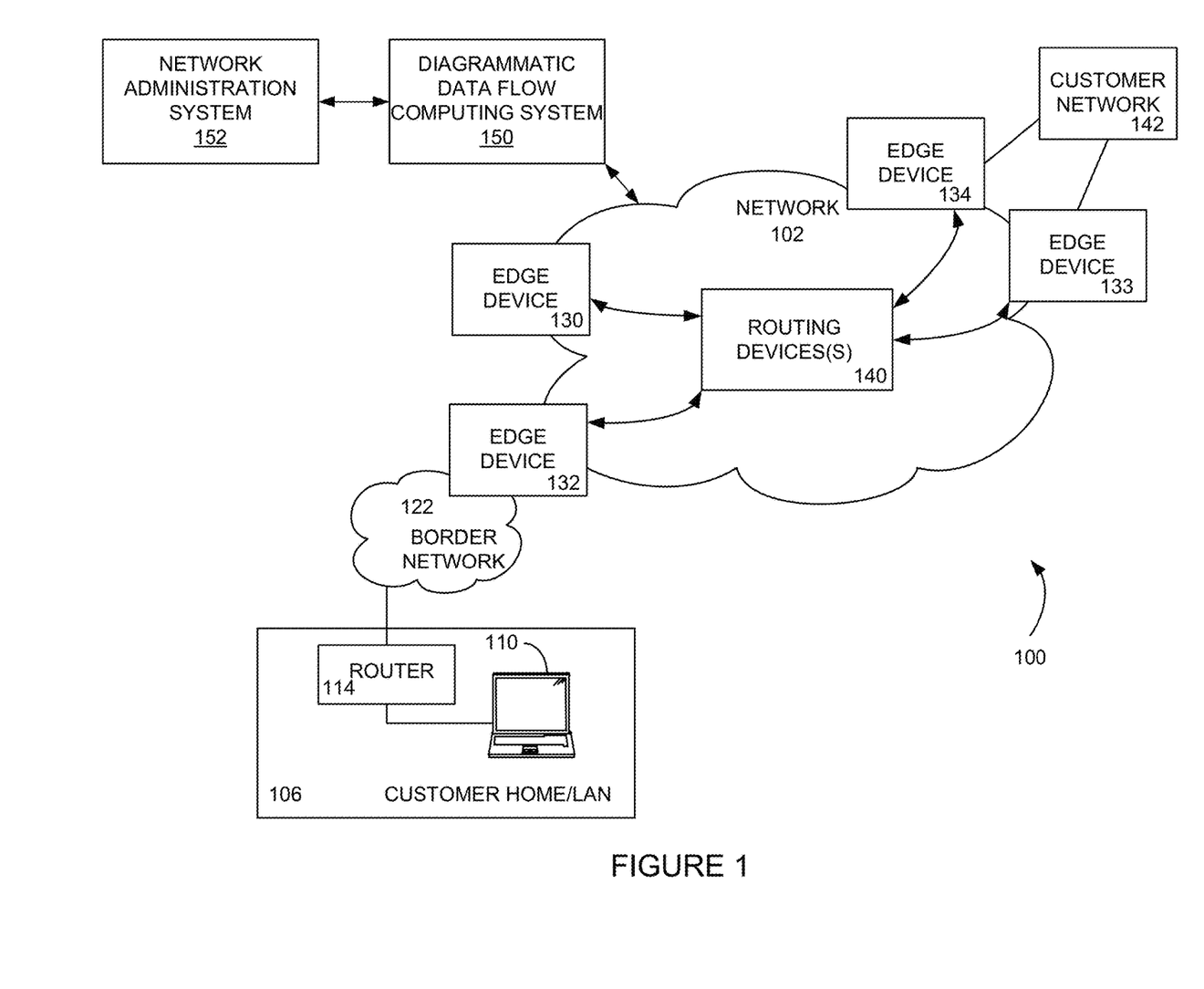
FIG. 1 schematic diagram illustrating an exemplary telecommunications system in accordance with one implementation of the present disclosure.

FIG. 1 illustrates a representative telecommunications system 100, which may be or include a CDN, with a diagrammatic data flow computing system 150. In general, the telecommunications system 100 provides for communicating data across a network 102 including for providing one or more network services to network users. More generally, however, the telecommunications system 100 facilitates transmission of network traffic (which may include information, commands, and the like) between devices, services, networks, or any combination thereof. For example, a device 110 may request content that is stored or otherwise available through the network 102. In one implementation, a customer network, such as customer network 142, may connect to the network 102 in several locations or through several access points and a request for services may include providing the service to some or all of the customer's connection points.

The network 102 includes numerous components such as, but not limited to gateways, routers, and registrars, which enable communication and/or provides services across the network 102, but are not shown or described in detail here because those skilled in the art will readily understand these components. More relevant to this description is the interaction and communication between the network 102 and other entities, such as the one or more customer home or business local area networks (LANs) 106 or customer networks 142, where a user of the network will connect with the network.

Customer network 106 can include communication devices such as, but not limited to, a personal computer, set top box, or other device, connected to a router/firewall 114. Although shown in FIG. 1 as computer 110, the communication devices may include any type of communication device that receives a multimedia signal (such as an audio, video, or web-based signal) or receives/transmits data and presents that signal or data for use by a user of the communication device. The communication and networking components of the customer network 106 enable a user at the customer network 106 to communicate via the network 102 to other communication devices, such as another customer 126 or another customer network 142. Access to the Internet may also be provided through the network 102. Components of the customer network 106 are typically home- or business-based, but they can be relocated and may be designed for easy portability. For example, the communication device 110 may be wireless (e.g., cellular) telephone, smart phone, tablet or portable laptop computer. In some implementations of the present disclosure, multiple communication devices in diverse locations that are owned or operated by a particular entity or customer may be connected through the network 102. For example, customer network 142 connects to network 102 through two edge device components 133, 134. Such connections may be geographically diverse such that the customer network 142 connects to the network in various locations. As should be appreciated, the customer network 142 may connect to the telecommunications network 102 through any number of connections.

The customer network 106 may connect to the network 102 via a border network 122, such as one provided by an Internet Service Provider (ISP). The border network 122 is typically provided and maintained by a business or organization such as a local telephone company or cable company. The border network 122 may provide network/communication-related services to their customers. Communication via any of the networks can be wired, wireless, or any combination thereof.

An operator of the network 102 may configure the network in any manner to facilitate the routing of communications through the network. For example, the network 102 may include a series of interconnected networking devices, such as routers and switches (illustrated in FIG. 1 as "routing device(s)" 140), that receive a communication, analyze the communication to determine a destination, and route the communication to a connected networking device to get the communication closer to a destination or egress point. In another example, the routing devices 140 may include one or more servers or other data storage devices. Such devices may store content that is available to users of the network 102 or provide routing instructions to communication devices connected to the network for accessing such content. To facilitate such communications, routing or transmission paths through the network 102, and in particular between two or more components of the network, provide for the exchange of data packets to provide the services and/or content of the network to the network customers.

As mentioned above, routes or paths through the network 102 connect two or more devices of the network. These paths define how data may travel or flow through a network as the devices share data and communications. Large telecommunications networks may include several million of such paths that exchange data or communication packets on a daily basis to provide services and content to network users. As should be appreciated, tracking the performance or each path of a network flow may be close to an impossible task for a network administrator. Further, even limiting the view of network flows to a particular component or group of components may not provide an easily understandable picture of the network flows for those components. Thus, a system is provided herein that processes any number of network data flows and generates understandable visual data flow diagrams for use by network engineers or administrators to configure or provision network elements to improve the efficiency and operation of a telecommunications network. The data flow diagrams may be customizable for particular portions of the network as desired to further improve the understanding of the network configuration.

FIG. 1 is further illustrated as including a diagrammatic data flow computing system 150. As will be described below in further detail in the context of FIGS. 2-4, the diagrammatic data flow computing system 150 is generally configured to collect network flow data from devices of the network 102, to process such data (e.g., by filtering and/or aggregating the data), and to generate diagrams and visualizations from the data illustrating data flows within the network 102. The processed data and/or diagrams may be accessed by network administrators from the diagrammatic data flow computing system 150 either directly or through a network administration system 152 in communication with the diagrammatic data flow computing system 150. The diagrammatic data flow computing system 150 may also be incorporated into a broader network monitoring and administration system, such as any relevant device in a network operational center (NOC). In certain implementations and as further discussed below, the diagrammatic data flow computing system 150 and/or the network administration system 152 be configured to automatically generate transmit one or more configuration instructions to devices of the network 102 in response to the network flow data collected and processed by the diagrammatic data flow computing system 150.

Figure 2:
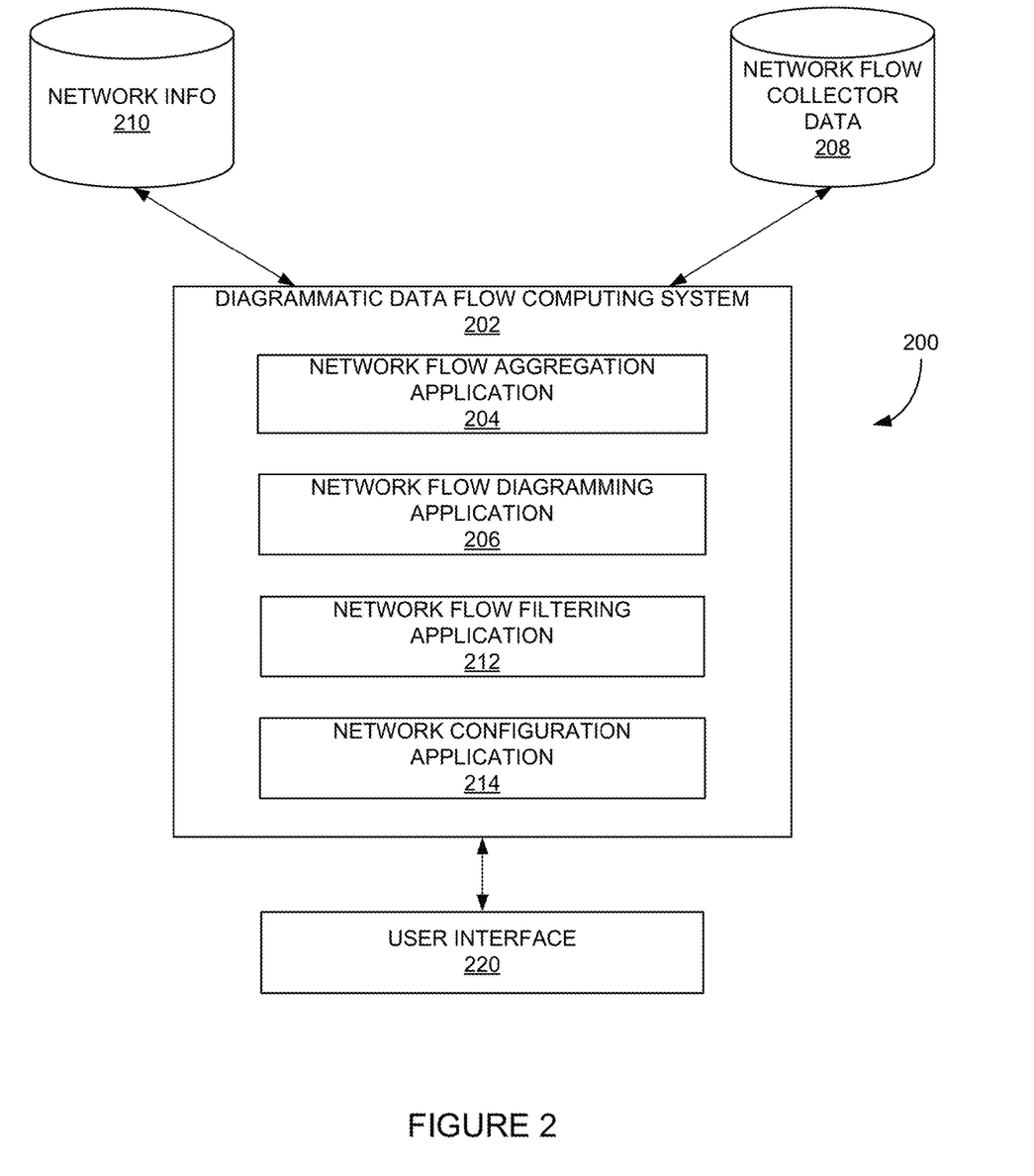
FIG. 2 is a block diagram illustrating a computing environment including a diagrammatic data flow computing system and associated data sources, such as may be included in the network environment of FIG. 1.

FIG. 2 is a block diagram illustrating a computing environment 200 for use in generating and presenting diagrammatic representations of network data flows. The environment 200 includes a diagrammatic data flow computing system 202 for a telecommunications network in accordance with one implementation of the present disclosure and which may generally correspond to the diagrammatic data flow computing system 150 of FIG. 1. The system 202 may include several components or applications for receiving network data flow information, processing the information based on aggregating techniques and/or one or more information filters, and generate a network flow diagram corresponding to the network information. In some instances, the system 202 may also generate and/or provide network configuration instructions or commands based on the generated network flow diagram and transmit those instructions to the network or a network administrator for execution. Other components may be present in the system 202 although not illustrated in FIG. 2 or discussed herein.

Many telecommunications networks provide network data flow information to network administrators or engineers. For example, components of the network 102 may be configured to generate and self-report routes, data flows, packets processed, alarms, states, and other operational information to a centralized network operational center (NOC). Multiple systems within the NOC may then process the information in an attempt to determine operational status of the components of the network. In other network configurations, a network flow collector (e.g., a NetFlow collector) may be deployed within or in communication with the network to obtain network data flow information. In one example, the network flow collector may be an application or applications that requests operational and data flow information from components of the network 102 on a continual basis. This may include both self-reporting and requests for operational information from the components. The collected network data flow information may then be stored as network flow collector data 210 and made available to the diagrammatic network flow computing system 202. Through the network flow collector and/or NOC, at least some aspect of the flow of communications and data through the network 102 may be obtained and provided to the diagrammatic network flow computing system 202.

Additional network information 210 may also be available to the diagrammatic network flow computing system 202. For example, routing tables for routing information between components of the network 102 may be gathered and stored in the network information database 210. Such information may be obtained through Border Gateway Protocol (BGP) and Interior Gateway Protocol (IGP) announcement sessions between components of the network. Other network information, such as port assignments, transmission line information, and Internet Protocol (IP) address or other component identifying information may also be stored in the network information database 210. In general, any network information pertaining to any number of flows of data through the network 102 may be obtained by the network flow collector and stored in the network flow collector data 208 or stored in the network information database 210 for use by the diagrammatic network flow computing system 202 of FIG. 2.

The information provided through the network flow collector or within the network information database 210 is typically in a text-based format. In general, dataflow information received from (or obtained by the network flow collector) any component of the network may include text information for any aspect of the data flow. For example, data flow information from an ingress device of the network 102 may include an entry for ingress region, ingress country, ingress state, ingress city, ingress gateway, ingress router, and ingress interface for each data flow. Egress information may also be obtained, such as an entry for egress region, egress country, egress state, egress city, egress gateway, egress router, and egress interface. Other information of data flows, such as ingress Autonomous Service Network (ASN), egress ASN, source device ASN, destination device ASN, and the number of data bytes transmitted for each data flow between devices of the network, may also be collected. Data flow information for a particular device of the network 102 may be obtained through analysis of network configuration (such as through network information database 210), such as the ingress and egress region, country, state, city, gateway, etc. Other data flow information, such as ingress ASN, egress ASN, source device ASN, etc. may be obtained through an analysis of a received communication at the device. Such information may be included in metadata or other signaling information included in the communication. Further, the components of the network 102 may track or store an amount of data (measured in bytes, in some instances) transmitted from the component to other components in the network and provide such information to a database of the network upon receiving a request for such information. Through the combination of network information sources, the diagrammatic data flow computing system 202 may obtain or receive any data flow information for the transmission of data through the telecommunications network 102.

Once network flow data is obtained or received, the diagrammatic data flow computing system 202 may execute one or more applications to process the data, generate a diagram of network data flow, and/or configure one or more components of the network according to the network data flow diagram. For example, and explained in more detail below, the diagrammatic data flow computing system 202 may execute a network flow filtering application. The filtering application may apply one or more filters to the network flow data to reduce the amount of information included in a network flow diagram and enhance the display of the information shown. In one implementation, the type of data filter applied to the network flow data may be based on an input received at the diagrammatic data flow computing system 202 from a user interface 220. More particularly, a user interface 220 may be in communication with the diagrammatic data flow computing system 202. A user of the diagrammatic data flow computing system 202 (such as a network administrator) may utilize the user interface 220 to provide inputs to the applications of the diagrammatic data flow computing system. For example, a user may select a particular device of the network 102 for which to view data flows through the particular device in a network flow diagram. The filtering application 212 may then isolate or identify the portion of the received network flow information that corresponds to the received component selection for inclusion in a network flow diagram.

In general, any aspect of the network data flow information may be selected as a filter. For example, a user may filter the network data flow information based on particular components, particular regions, particular gateways, particular ASNs, and the like. Further, more than one filter may be applied to the network data flow information by the filtering application 212. For example, the user may provide several filtering inputs to the user interface 220 to further refine the desired network flow data to be included in the network flow diagram. In this manner, the millions of network data flows for the telecommunications network 102 may be reduced so that the network flow diagram is tailored for use by the system 202 or a network administrator.

Another application that may be included in the diagrammatic data flow computing system 202 is a network flow aggregating application 204. The aggregating application 204, in general, aggregates particular network data flows of a subset of the network data flow information (which may be but is not necessarily a proper subset of the network data flow information) per attribute of the network data flows. For example, even after the application of one or more filters to the network flow data, several thousand data flows may be still remain in the network flow data to be illustrated in the network flow diagram. To improve the understanding of the network flow diagram, certain data flows may be combined prior to generating the diagram. The aggregated network data flows may be data flows that are smaller in size (based on number of bytes of the data flow) relative to the other data flows in the subset of network flow information. This may act to reduce the number of data flows included in the network flow diagram. In one particular implementation of the present disclosure, such data flows may be gathered into a collected network data flow and labeled as "other" or "miscellaneous" such that the network flows are included in the network flow diagram, but are not represented individually within the diagram. Such aggregation may be executed for any attribute of the network data flows to reduce the information illustrated in the corresponding network flow diagram.

In other instances, aggregation of network data flow information may be based on other aspects of the network flow information and a new data point may be created in the network flow data. For example, a particular telecommunications network 102 may include several gateways or ingress devices in a particular metro area. Such devices may be aggregated together as a single metro area and a new data point for "ingress metro" may be created and added to the network flow information. The created attribute may also be stored in the network information database 210 or the network flow collector information for use by the diagrammatic data flow computing system 202. Other attributes for the network data flow information may be created by the aggregating application 204 and included in the network flow data and/or the network flow diagram.

Figure 4:
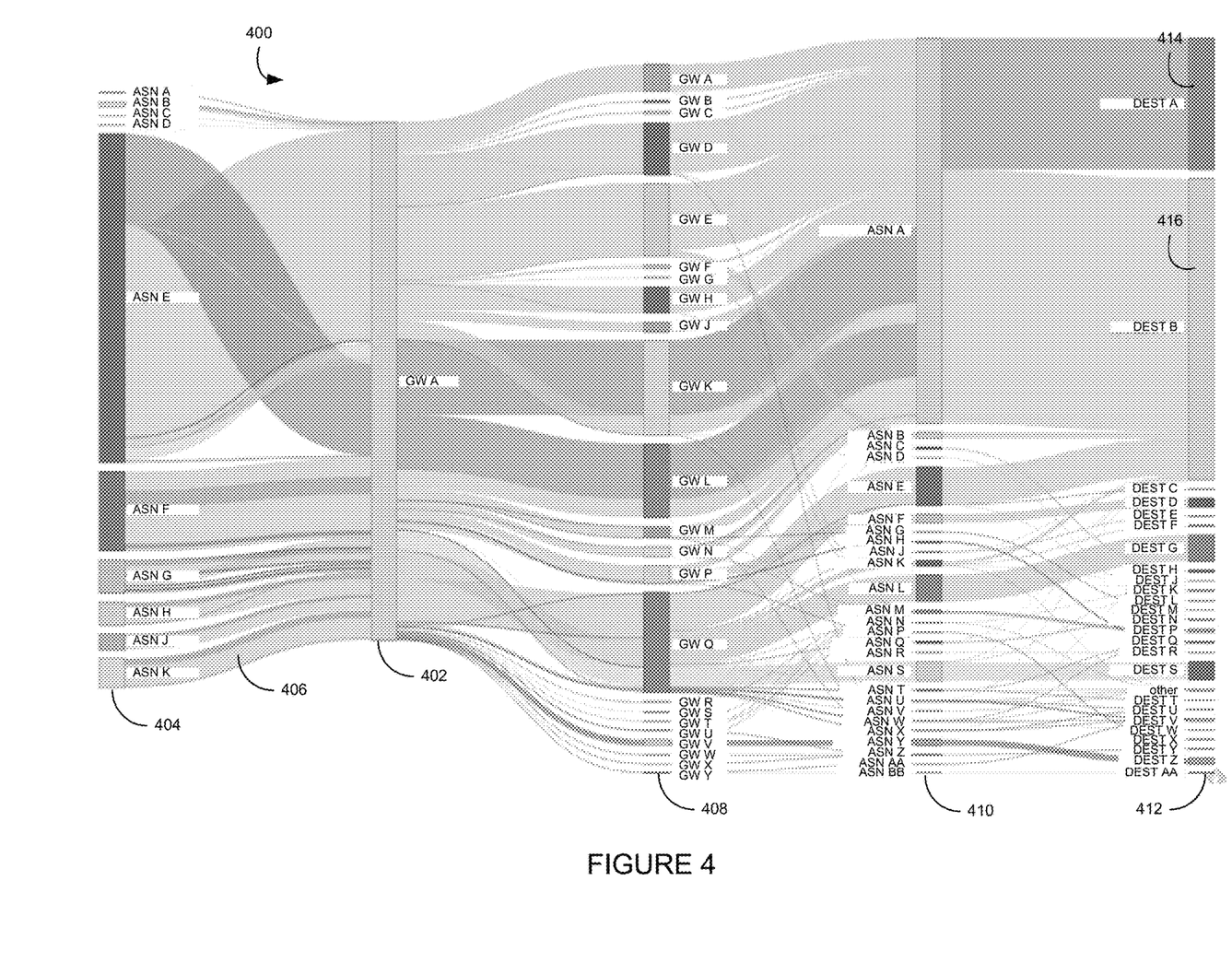
FIG. 4 is an exemplary network flow diagram for use in provisioning an aspect of a telecommunications network in accordance with one implementation of the present disclosure.

The diagrammatic data flow computing system 202 may utilize the filtered and aggregated network flow information to create a network flow diagram and display the generated diagram on a display (such as through the user interface 220 discussed above). One example of a network flow diagram for a particular ingress component of the telecommunications network 102 is illustrated in FIG. 4 and discussed in more detail below. Although a particular implementation is illustrated in FIG. 4, it should be appreciated that other visual representations or diagrams may be generated by the diagrammatic data flow computing system 202. Through the diagram, a visual representation of network data flows may be provided to the user of the user interface 220 or other applications of the diagrammatic data flow computing system 202.

In addition, the diagrammatic data flow computing system 202 may also include a network configuration application 214. In general, the network configuration application 214 analyzes a network flow diagram and generates one or more network commands to configure aspects of the telecommunications network. Through the analysis, the network configuration application 214 may determine one or more inefficiencies or redundancies in network data flow between the components included in the diagram. The network configuration application 214 may then generate and transmit one or more configuration instructions to network components to address the determined inefficiencies. In another implementation, the network configuration application 214 may generate an alert or alarm to a network administrator, such as through a message on the user interface 220 or an electronic mail sent to a network administrator e-mail address. The alert may include suggestions for network configurations to address the determined network inefficiency. In still other instances, an alert displayed on the user interface 220 to a user of the system 202 may provide configuration instructions that may be selectable by the user to configure the network accordingly. In general, any configuration of the network may be made in response to the network flow diagram generated by the diagrammatic data flow computing system 202.

Figure 3:
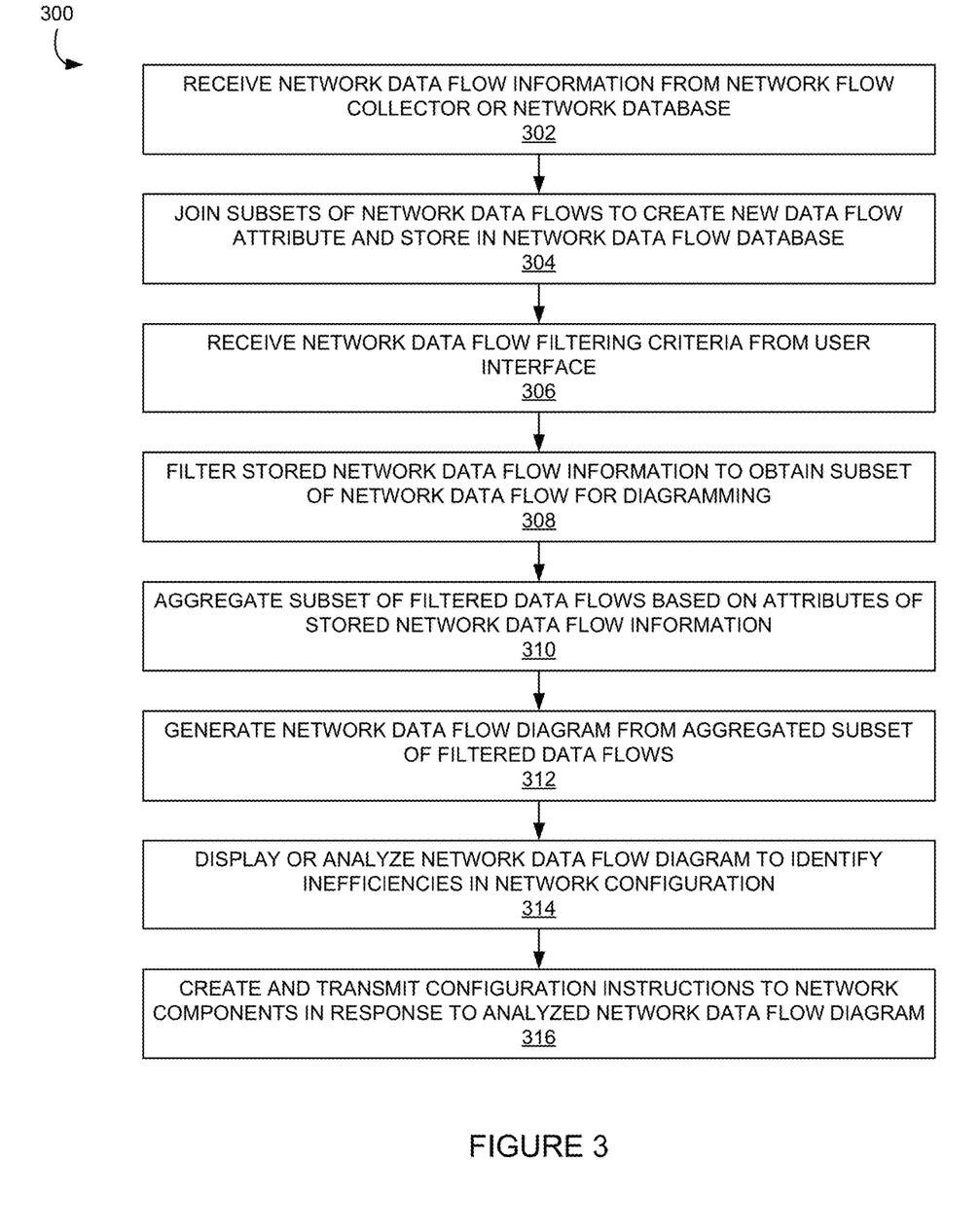
FIG. 3 is a flowchart of a method for generating a diagram of a flow of network data through a telecommunications

To diagram the network flow data of a telecommunications network 102, the diagrammatic data flow computing system 202 (and corresponding applications) may perform particular operations. In particular, FIG. 3 is a flowchart of a method 300 for generating a diagram of a flow of network data through a telecommunications network and provisioning an aspect of the network in accordance with one implementation of the present disclosure. The operations of the method 300 may be performed by any component of the diagrammatic data flow computing system 202, such as the applications of the system discussed above. As such, the operations may be executed through a hardware component of the diagrammatic data flow computing system 202, through one or more programs of the system, or any combination of hardware and software components.

Beginning in operation 302, the diagrammatic data flow computing system 202 receives network data flow information from the network 102. As described above, the network data flow information may be obtained from a network database 210, network flow collector data 208 (e.g., as obtained from a network flow collector deployed in the network 102), and/or from one or more components of the network itself. The network data flow information may include any aspect of the flow of data or communications through the network 102, including ingress information, egress information, and the number of bytes transmitted between devices within the network. In one particular implementation, the bytes of data transmitted through a particular data flow may be obtained daily from the network 102 for use in generating a network data flow diagram.

In operation 304, the diagrammatic data flow computing system 202 may join subsets of the network data flow information together to form new data flow sets or attributes. For example, the system 202 may combine data flows from several related ingress devices if such devices are located within the same metro area. A new attribute may then be created by the system 202 for those identified data flows that contain the joined network data flow information. Extending the above example, each network data flow set of information that is included in the same metro area may be modified by the system 202 to add a new attribute that identifies the shared metro, such as an "ingress metro" attribute. Other shared aspects of network data flows may be identified and new attributes added to the network data flow information corresponding to the shared aspect may be added by the system 202.

In addition, network data flows that share attributes may be combined by the diagrammatic data flow computing system 202. For example, a data flow may include information for a particular communication session between two or more components of the network 102. However, at a later time, an additional communication session may occur between the same two components of the network 102.

Thus, the system 202 in this circumstance may identify that the aspects of the network flow data are the same from the first session and the second session and combine the transmitted data bytes from the sessions into a single data flow. In this manner, the diagrammatic data flow computing system 202 may reduce or combine similar network data flows from the received data flow information.

One or more filtering criteria for limiting the network flow information that is included in the diagram may be received at the diagrammatic data flow computing system 202 in operation 306. In one particular implementation of the present disclosure, the filtering criterion is received through a user interface 220 in communication with the diagrammatic data flow computing system 202. Through the user interface 220, a user (such as a network administrator) may provide inputs or otherwise identify particular attributes of a subset of network data flows to limit the number and type of data flows to be diagrammed. For example, a user may indicate a particular ingress gateway in the user interface 220 when attempting to view the network data flow associated with that ingress gateway. Other filtering criteria may also be provided in addition to or separate from the ingress gateway, such as an egress gateway, an ingress network, an egress network, an ingress ASN, an egress ASN, whether the network data flows are a part of a CDN (such as may be indicated by a CDN identifier), etc. In general, any attribute of network data flow information discussed above may be identified as a filtering criteria by the user interface 220 and applied to generate a subset of the overall network data flow information. An example of a filter that limits the network data flow information to a particular ingress router device is used through the remainder of the description of the method 300 of FIG. 3 and the network flow diagram 400 of FIG. 4. It should be appreciated, however, that any attribute of the received network data flow may be received and applied to the network data flow information to obtain the particular data flow information illustrated in the diagram discussed below.

In operation 308, the diagrammatic data flow computing system 202 may filter the complete network data flow information utilizing the received filter information to generate a subset of the network data flow information for diagramming. In operation 310, the subset of network data flow information may further be reduced or aggregated based on the attributes of the subset of network data flow information. For example, the diagrammatic data flow computing system 202 may include a limit on the number of data flows that are illustrated in a particular network data flow diagram. The limit of data flows may be set by the system or may be based on an input provided to the system through the user interface 220. In one particular implementation, the number of data flows illustrated in a diagram may be limited to twenty-five data flows to ensure that the diagram is not over-crowded with illustrated data flows. Thus, the diagrammatic data flow computing system 202 may aggregate some of the subset of network data flows into an "other" or "miscellaneous" collection of network flows when those data flows fall below a particular threshold value.

In one particular example, the diagrammatic data flow computing system 202 may rank the network data flows in the filtered subset of network data flows by number of bytes transmitted over a period of time, such as over the previous 24 hours. As mentioned above, each network data flow entry may include a number of bytes transmitted over the period of time. Thus, the diagrammatic data flow computing system 202 may rank each network flow based on the number of processed bytes of data. Further, the system 202 may then combine or aggregate information for those network data flows that are below the limit of data flows to be included in the diagram. For example, the network data flows with a number of bytes of transmitted data below the first twenty-five data flows may be combined into a single network data flow for inclusion in the data flow diagram.

To aggregate data flows, certain attributes of a data flow may be altered within the network data information to indicate the aggregation. For example, if a subset of the network data flows is filtered based on ingress gateway, those network data flows that fall below the threshold may have an ingress gateway entry in the data flow information altered to a generic entry, such as "other" or "miscellaneous". In this manner, separate data flows may be combined under a generic attribute. Further, aggregation of network data flows may also occur after alteration to the network data flow information. For example and as mentioned above, data flows with the same attributes may be combined into a single data flow by the diagrammatic data flow computing system 202, such as data flows that occur along the same route through the network but occur at different times. These similar data flows may be combined by the diagrammatic data flow computing system 202 to create a data flow for that particular day along the route described in the data flow attributes. Thus, after a particular attribute of the subset of network data flows is altered or changed to the generic entry (i.e., "other" or "miscellaneous"), more data flows may have similar attributes and can be combined by the system. For example, two data flows may have the same attribute values but different egress gateways values. If the egress gateway values are generalized to a generic value as described above, the two data flows may then have the same attributes along the entire route through the network and may therefore be combined into a single data flow. In this manner, re-aggregation of network data flows may occur within the network data flow information after one or more data flow attributes have been altered. Further, this re-aggregation process may occur through an iterative process after any change or generalization of the network data flow information.

Once the network data flow information has been filtered and aggregated, the diagrammatic data flow computing system 202 may then generate a network data flow diagram in operation 312. One particular example of a network data flow diagram 400 is illustrated in FIG. 4. Although a description of the network flow diagram 400 of FIG. 4 is provided herein, it should be appreciated that the diagram of the network data flow information may take any form of known or hereafter developed diagrams. The network flow data illustrated in the diagram 400 includes data transmitted through a telecommunications network that is filtered and/or aggregated as described above. In particular, the illustrated network flow data of the diagram 400 is filtered for a particular ingress gateway device of the network such that the diagram illustrates all data flows through that particular ingress gateway device over a 24-hour period. Attributes of the collected network data flows are illustrated, including ingress ASN, egress gateway, egress ASN, destination ASN, and total transmitted bytes for each data flow over the 24-hour period. Other diagrams of network data flows may illustrate other attributes over a longer or shorter period of time. In general, any values included in the collected network data flow for the telecommunications network may be illustrated in the diagram 400 in some manner.

The network flow information of the diagram 400 of FIG. 4 is presented as a Sankey-type diagram. Other types of diagrams may also be utilized by the diagrammatic data flow computing system 202 to illustrate the network flow data. In the diagram 400 of FIG. 4, each data flow measured for a particular ingress gateway 402 to the network 102 is shown. In general, the ingress gateway is illustrated in the diagram 400 as bar 402. Further, the overall size of the bar (or any bar or data flow illustrated in the diagram 400) is relative to the number of data bytes transmitted through the bar in the given time period of the network data information. For example, the height of ingress gateway 402 may correspond to a number of data bytes transmitted through that gateway in the previous 24-hour period. In another implementation, a user of the diagrammatic data flow computing system 202 may provide a beginning and ending time to define a time period as a network data flow filter. Other components of the diagram 400 (such as the height of other bars 408-412 or data flows 406) may also correspond to a number of data bytes for those particular components.

To create the diagram 400 of FIG. 4, a user of the diagrammatic data flow computing system 202 provides a filter to the system that limits the network data flow information to the ingress gateway. For example, if the user chooses to filter the network data flow information based on the ingress gateway 402, the data flows illustrated in the diagram 400 (e.g., as a colored or shaded flow from left to right through the diagram) will be limited to those that transmit through the ingress gateway 402. In one implementation of the present disclosure, each data flow 406 is of a unique color to differentiate one network flow from another. In another implementation of the present disclosure, each data flow 406 is shaded to provide differentiation between the flows. As mentioned, the size or height of each data flow 406 may correspond to a data bytes of the network flow included in the network flow information. In one particular implementation, the color or shade of the network data flow 406 may be based on the destination ASN 412 for each data flow. In other words, data flows terminating at destination ASN A 414 may be a different color or shade than data flows terminating at destination ASN B 416. Further, in some implementations, the data bytes associated with any one data flow may be display within the diagram 400. For example, a user of the user interface 220 may select a particular data flow through an input device to a computer executing the user interface and information about the selected data flow may be provided in the diagram 400, such as a number of processed bytes associated with the data flow.

The diagram 400 of FIG. 4 illustrates an ingress ASN 404 from which each of the data flows for the ingress gateway 402 is received at the network 102. Similar to other aspects of the diagram 400, the ingress ASNs 404 for the data flows are illustrated as a colored or shaded box with a label (potentially identifying a geographic location of the ASN) and a relative height associated with the size of the data flows originating from the ingress ASN 404. As shown, some of the ingress ASNs 404 may be associated with more than one data flow, as illustrated by the multiple colored or differently shaded data flows originating from the ingress ASNs. In a similar manner, the network flow diagram 400 illustrates egress gateways 408 from the telecommunications network 102 from which the network flows exit the network. Egress ASNs 410 for each network data flow and destination ASNs 412 are also illustrated. It should be appreciated that more or fewer attributes of the network flow information may also be included in the diagram 400 based on the filtering information applied to the network data flow information. For example, ingress metro, ingress region, egress city, egress country, etc. may be included in the diagram for the network flows in a similar manner as the ingress ASN, ingress gateway, egress ASN, egress gateway, etc. Further, each value in the network flow attributes that are illustrated may be labeled within the diagram 400 to provide identifiable information to a viewer of the diagram.

Through the network flow diagram 400, an understanding of data flows through components of the telecommunications network may be obtained. For example, a system or viewer receiving the diagram 400 may visually follow a data flow from an ingress ASN through the network to a destination ASN. Further, because each data flow is uniquely colored or shaded, the system or viewer may track the data flow through the components of the network 102. As explained in more detail below, this information may be utilized by a network or a network administrator to configure one or more components of the telecommunications network 102 in response to the network data flow information illustrated in the diagram 400.

To configure the telecommunications network 102 in response to the information in the network flow diagram 400, the diagrammatic data flow computing system 202 may provide the network flow diagram to the user interface 220 in communication with the system. In one particular example and returning to the method 300 of FIG. 3, the diagram 400 may be displayed on a display device of the user interface 220 in operation 314. A network administrator may view the diagram 400 on the display device to gain an understanding of the operation of at least a portion of the telecommunications network 102. In an alternate implementation, the diagrammatic data flow computing system 202 may analyze the diagram 400 to determine attributes or features of the illustrated data flows without necessarily displaying the diagram on a display device. In other words, the diagrammatic data flow computing system 202 may process the network data flow information into a diagram through which the system can analyze the information and determine an operation of the network. Regardless of whether the diagram 400 is displayed on a display device or user interface or analyzed by a system, the network flow information contained within the diagram may be utilized to configure or alter a configuration of a telecommunications network in response.

In particular, the diagrammatic data flow computing system 202 in operation 316 may analyze the information included in the network flow diagram 400 to determine an operation of the telecommunications network 102. For example, the system 202 may determine that a network data flow is transmitted through the network 102 in an inefficient manner, such as being transmitted from one continent to another and back before egressing from the network. Other inefficiencies may also be determined, such as transmission between various components of the network 102 before egressing from the network when a single network flow to a particular egress component may connect the data flow to the egress ASN. In general, any analysis of the network data flows within the diagram 400 may be conducted by the system 202 to determine an operation of the network 102 to identify one or more inefficiencies within the network. Further, the network flows in the diagram 400 may be measured against a particular performance threshold value to identify the inefficiency. For example, a measured geographic distance of a network flow may be compared against a maximum threshold distance value by the system 202. If the measured or estimated network flow distance exceeds the threshold performance value, the network flow within the diagram 400 may be identified as inefficient and a candidate for alteration by the system.

Further, the diagrammatic data flow computing system 202 may also generate and transmit one or more configuration instructions to components of the network 102 to configure the transmission of data through the network in response to the analysis of the network data flow diagram 400. For example, when an inefficiency in the transmission of data through the network 102 is determined, the system 202 may identify a more efficient (e.g., shorter or underutilized) transmission path through the network and configure the components of the network included in the new transmission path to accept and transmit the re-directed data flow. Such configuration of the network 102 may include providing instructions to one or more components of the network 102 to create a new data flow through the network when the instructions are executed by the receiving network components. In another implementation of the present disclosure, a network engineer or designer may utilize the information included in the network data flow diagram 400 to identify inefficiencies in the network configuration and transmit configuration instructions to components of the network 102 to create a new data flow route through the network. Regardless of the implementation, the data flow information included in the network flow diagram 400 may be utilized to configure one or more components of the telecommunications network 102 to alter or create a data flow through the network.

Through the systems and methods described above, a telecommunications network 102 may generate one or more visual data flow diagrams of network data flows through the telecommunications network. Such diagrams may be utilized by network engineers or administrators to configure or provision network elements to improve the efficiency and operation of a telecommunications network. In one particular implementation of the present disclosure, a diagrammatic data flow system may receive network flow information, process the network flow information to reduce the volume of information into an understandable quantity of information, and generate a Sankey-like graph or diagram of the network flow information. Further, the diagrammatic data flow system may provide one or more network configuration commands based on the analyzed network flow data to improve the efficiency or cost of the operation of the network. In this manner, the diagrammatic data flow system may receive network flow data for a telecommunications network and process the data into a diagram of network flow data that can be utilized for network configuration.

Figure 5:
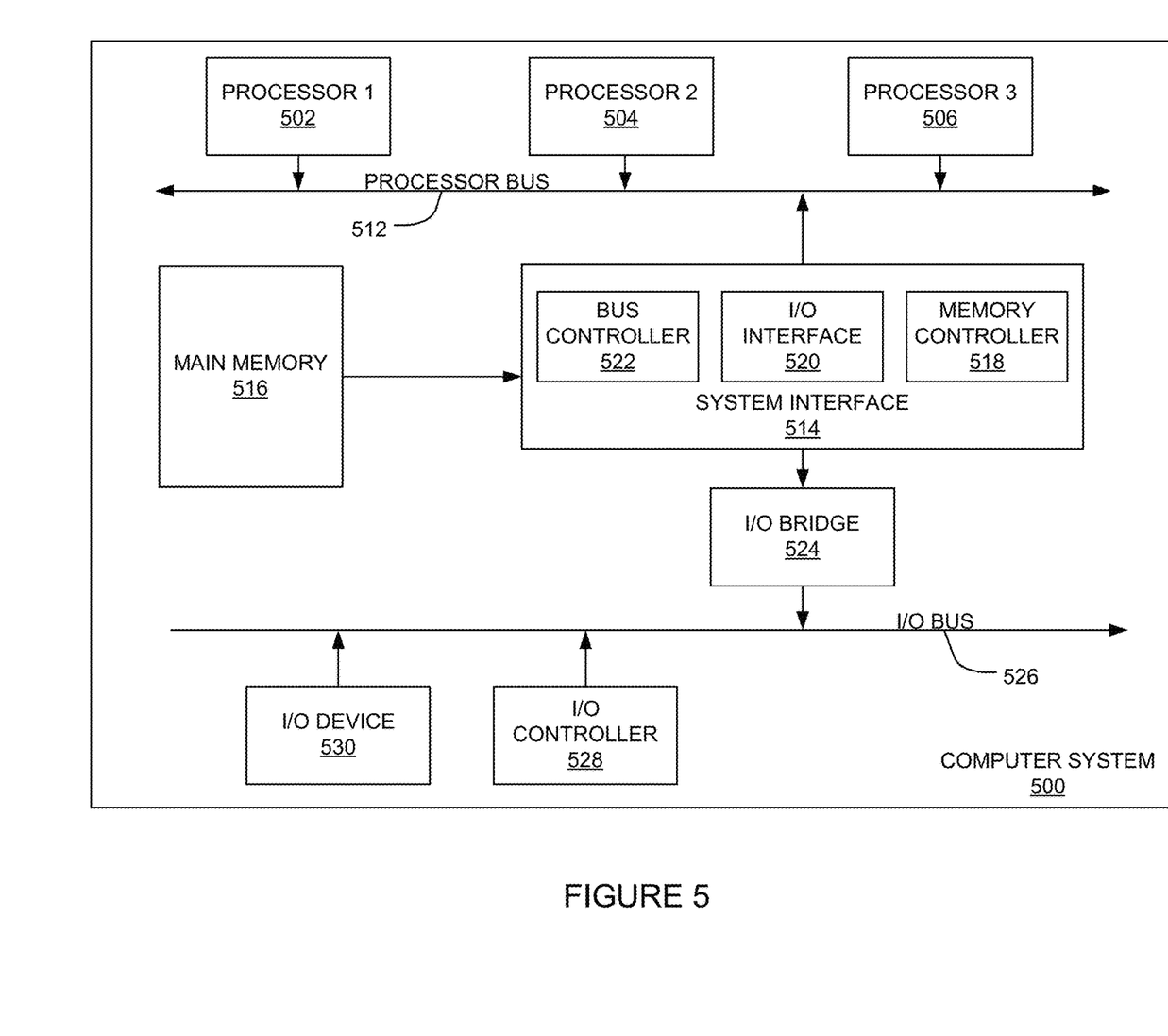
FIG. 5 is a diagram illustrating an example of a computing system which may be used in implementing the present disclosure.

FIG. 5 is a block diagram illustrating an example of a computing device or computer system 500 which may be used in implementing aspects of the systems and methods disclosed herein. For example, the computing system 500 of FIG. 5 may be the diagrammatic data flow computing system 202 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated. The system interface 514 may further include a bus controller 522 to interact with processor bus 512 and/or I/O bus 526.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one implementation of the present disclosure, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative implementations, circuitry may be used in place of or in combination with the software instructions. Thus, implementations of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Implementations of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various implementations, it should be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

I claim:

1. A method for configuring a telecommunications network, the method comprising:
    obtaining network data flow information for a telecommunications network, the network data flow information including attributes of a plurality of routes of data transmission through the telecommunications network;
    applying, utilizing at least one processing device, a filtering criteria to the network data flow information to identify a subset of the plurality of routes, the filtering criteria including an attribute shared among each of the subset of the plurality of routes; and
    generating a network flow diagram from the network data flow information corresponding to the subset of the plurality of routes by:
        identifying low traffic routes of the subset of the plurality of routes, traffic for each of the low traffic routes falling below a traffic threshold;
        generating an aggregated route by combining the low traffic routes; and
        replacing the low traffic routes in the subset of the plurality of routes with the aggregated route,
    wherein the network flow diagram includes a representation of the attribute of the filtering criteria, representations of other attributes of the subset of the plurality of routes, and representations of the subset of the plurality of routes.

2. The method of claim 1, further comprising:
    providing the network flow diagram to a display device in communication with the at least one processing device;
    subsequent to providing the network flow diagram, receiving, at the at least one processing device and from a computing device in communication with the at least one processing device, a configuration instruction for reconfiguring an attribute of the plurality of routes of data transmission; and
    transmitting a configuration command from the at least one processing device to the attribute, the configuration command corresponding to the configuration instruction and configuration to cause the attribute to alter the network data flow.

3. The method of claim 1, wherein the attributes of the plurality of routes comprise at least one of an ingress Autonomous Service Network (ASN), an egress ASN, an ingress gateway device, and an egress gateway device.

4. The method of claim 1, wherein the filtering criteria is received from a user interface executed on a computing device.

5. The method of claim 4, wherein the filtering criteria includes an ingress gateway, an egress gateway, an ingress network, an egress network, an ingress autonomous system number (ASN), an egress ASN, or a content distribution network (CDN) identifier.

6. The method of claim 1, wherein generating the aggregated route by combining the low traffic routes comprises:
    generating a generic attribute corresponding to attributes of each of the low traffic routes, the attributes of each of the low traffic routes having a common relationship to the attribute of the filtering criteria; and
    assigning aggregated data flow information to the generic attribute, the aggregated data flow information being an aggregate of data flow information for the attributes of each of the low traffic routes.

7. The method of claim 1, further comprising:
    collecting the network data flow information by deploying a network flow collector in the telecommunications network, the network flow collector configured to collect network data flow information from devices within the telecommunications network and to transmit the collected network data flow information to a central storage system,
    wherein obtaining the network data flow information comprises retrieving the network data flow information from the central storage system.

8. A method for configuring telecommunications networks, the method comprising:
    obtaining network data flow information for a telecommunications network, the network data flow information including attributes of a plurality of routes of data transmission through the telecommunications network;
    applying, utilizing at least one processing device, a filtering criteria to the network data flow information to identify a subset of the plurality of routes, the filtering criteria including an attribute shared among each of the subset of the plurality of routes;
    generating filtered data from the network data flow information corresponding to the subset of the plurality of routes by:
        identifying low traffic routes of the subset of the plurality of routes, traffic for each of the plurality of low traffic routes falling below a traffic threshold;
        generating an aggregated route by combining the low traffic routes; and
        replacing the low traffic routes in the subset of the plurality of routes with the aggregated route, wherein the filtered data includes network data flow information for the attribute of the filtering criteria, network data flow information for other attributes of the subset of the plurality of routes, and network data flow information for the subset of the plurality of routes;

identifying a network data flow from the subset of the plurality of routes through an analysis of the filtered data, the network data flow comprising a performance metric exceeding a performance threshold; and generating a reconfiguration message for an attribute of the identified network data flow, the reconfiguration message configured to reconfigure the attribute of the identified network data flow to alter the identified network data flow.

9. The method of claim 8, further comprising transmitting the reconfiguration message to the attribute of the identified network data flow to reconfigure the attribute.

10. The method of claim 8, wherein generating the aggregated route comprises:

generating a generic attribute corresponding to attributes of each of the low traffic routes, the attributes of each of the low traffic routes having a common relationship to the attribute of the filtering criteria; and assigning aggregated data flow information to the generic attribute, the aggregated data flow information being an aggregate of data flow information for the attributes of each of the low traffic routes.

11. The method of claim 8, further comprising generating a network flow diagram from the filtered data, the network flow diagram comprising a representation of the attribute of the filtering criteria, representations of other attributes associated with the subset of the plurality of routes, and representations of the subset of the plurality of routes.

12. The method of claim 8, wherein the performance metric is an estimated geographic distance of transmission for the particular network data flow.

13. The method of claim 8, further comprising:

collecting the network data flow information by deploying a network flow collector in the telecommunications network, the network flow collector configured to collect network data flow information from devices within the telecommunications network and to transmit the collected network data to a central storage system, wherein obtaining the network data flow information comprises retrieving the network data flow information from the central storage system.

14. The method of claim 8, the filtering criteria includes an ingress gateway, an egress gateway, an ingress network, an egress network, an ingress autonomous system number (ASN), an egress ASN, or a content distribution network (CDN) identifier.

15. A telecommunications system comprising:

a telecommunications network comprising:
  a plurality of network attributes; and
  a network flow connecting the plurality of network attributes; and at least one processing device in communication with the plurality of network attributes, the network flow configured based on a configuration message generated by the at least one processing device, wherein the at least one processing device generates the configuration message by:

obtaining network data flow information for a plurality of network flows through the telecommunications network;

applying a filtering criteria to the network data flow information to identify routes of data transmission through the telecommunications network, the filtering criteria including an attribute shared among each of the routes; and generating filtered data from the network data flow information corresponding to the routes of data transmission by:

identifying low traffic routes of the routes of data transmission, traffic for each of the low traffic routes falling below a traffic threshold;

generating an aggregated route by combining the low traffic routes; and replacing the low traffic routes in the routes of data transmission with the aggregated route, wherein the filtered data includes network data flow information for the attribute of the filtering criteria, network data flow information for other attributes of the routes, and network data flow information for the routes.

16. The telecommunications system of claim 15, wherein the at least one processing device further generates the configuration message by:

generating a network flow diagram from the filtered data, the network flow diagram comprising a representation of the attribute of the filtering criteria, representations of other attributes associated with the routes of data transmission, and representations of the routes of data transmission;

providing the network flow diagram to a display device in communication with the at least one processing device; and subsequent to providing the network flow diagram, receiving, from a computing device in communication with the at least one processing device, a configuration instruction for reconfiguring an attribute of the routes, wherein the configuration message corresponds to the configuration instruction.

17. The telecommunications system of claim 15, wherein the at least one processing device further generates the configuration message by analyzing the filtered data to identify a network data flow having a performance metric exceeding a performance threshold, wherein the network attribute is included in the network data flow having the performance metric exceeding the performance threshold.

18. The telecommunications system of claim 15, wherein:

the at least one processing device obtains the network data flow information by deploying a network flow collector in the telecommunications network, the network flow collector configured to collect network data flow information from devices within the telecommunications network and to transmit the collected network data flow information to a central storage system, and the at least one processing device obtains the network data flow information from the central storage system.

19. The telecommunication system of claim 15, wherein the at least one processing device receives the filtering criteria a user interface executed on a computing device in communication with the at least one processing device and the filtering criteria includes an ingress gateway, an egress gateway, an ingress network, an egress network, an ingress autonomous system number (ASN), an egress ASN, or a content distribution network (CDN) identifier.

* * * * *